UNITED STATES PATENT OFFICE.

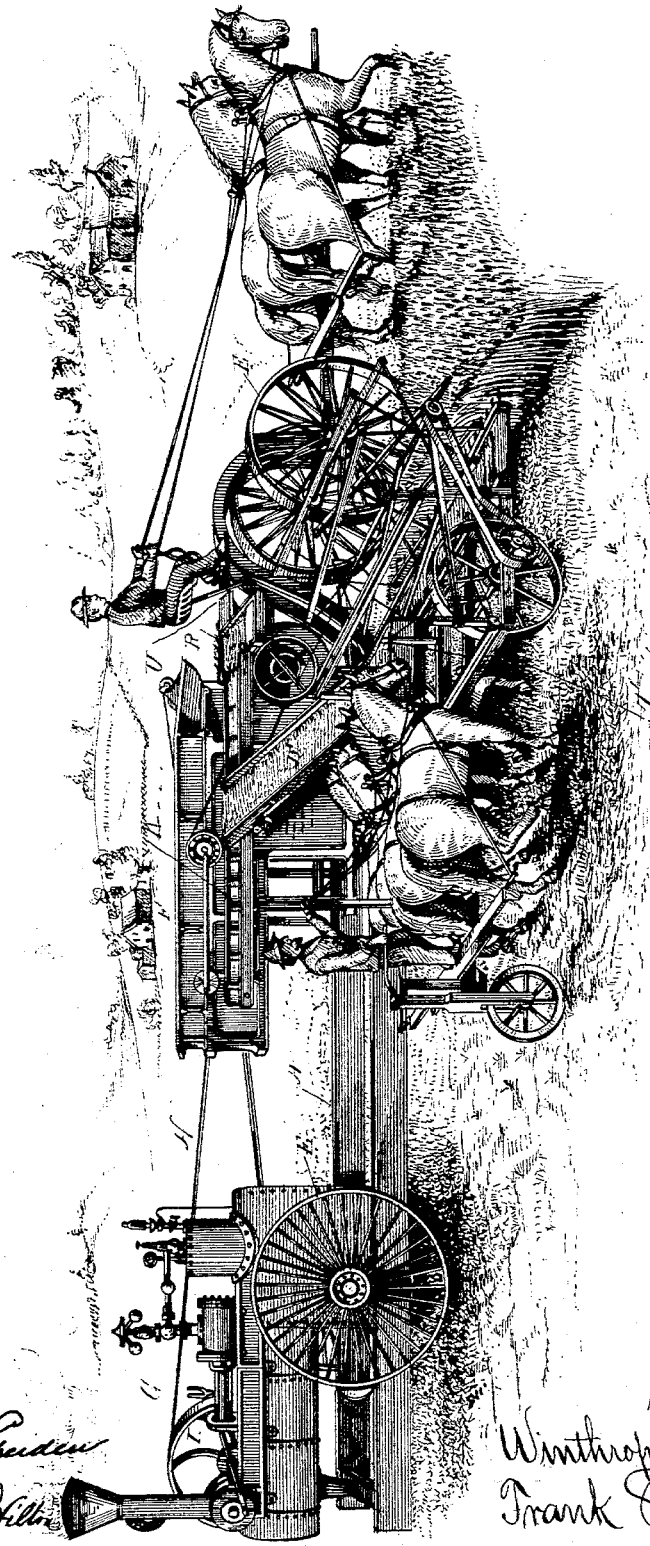

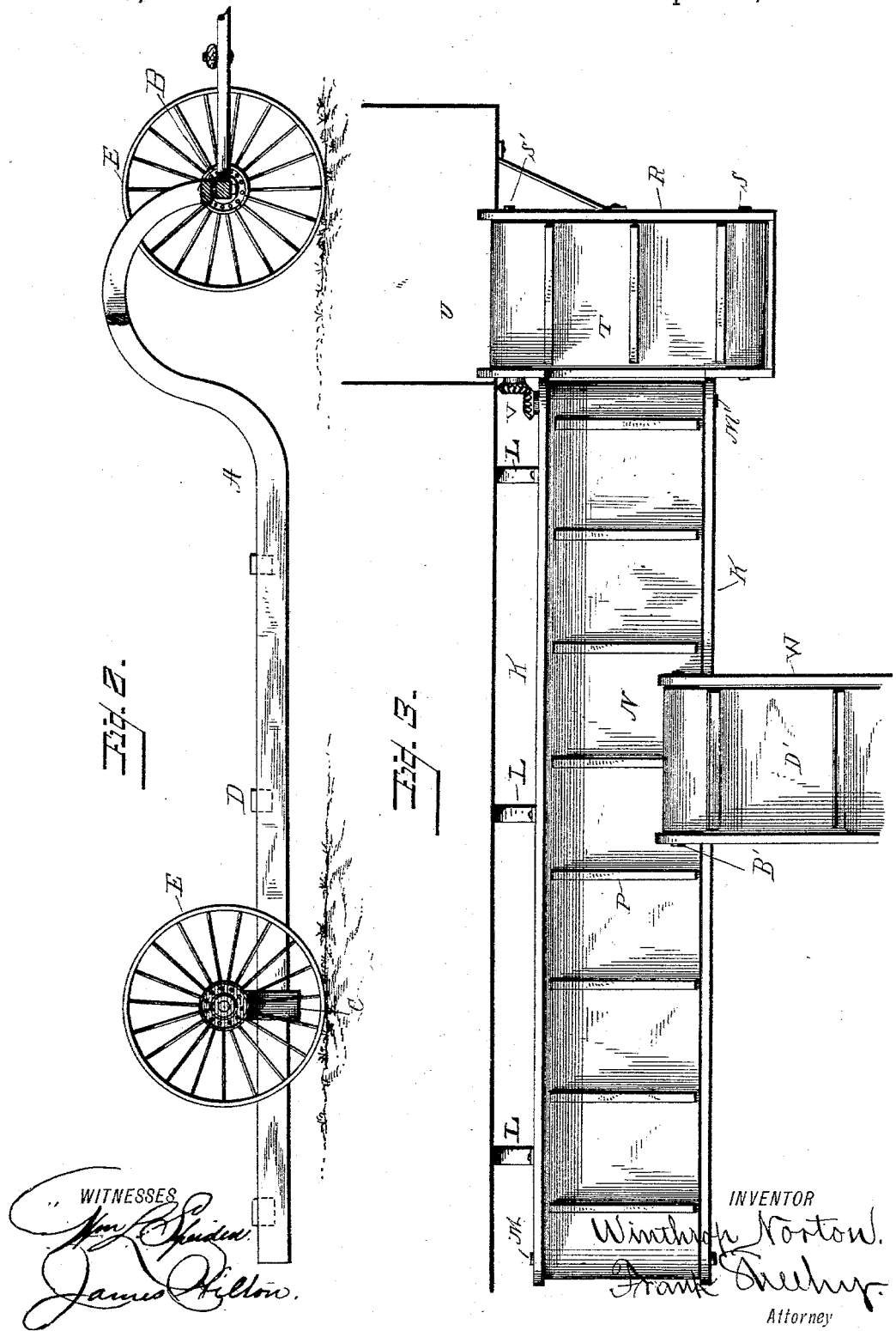

WINTHROP NORTON, OF ORLAND, CALIFORNIA, ASSIGNOR OF FORTY-NINE AND ONE-THIRD ONE-HUNDREDTHS TO CHARLES JOHN RUSSELL BALLARD, OF SAME PLACE, AND HIRAM MIZNER, OF COLUSA COUNTY, CALIFORNIA.

TRAVELING THRASHER AND SEPARATOR.

SPECIFICATION forming part of Letters Patent No. 315,651, dated April 14, 1885.

Application filed October 21, 1884. (No model.)

*To all whom it may concern:*

Be it known that I, WINTHROP NORTON, a citizen of the United States, residing at Orland, in the county of Colusa and State of California, have invented certain new and useful Improvements in Traveling Thrashers and Separators, of which the following is a specification, reference being had to the accompanying drawings.

This invention has relation to improvements in traveling thrashers and separators; and it consists in the construction, novel arrangement, and adaptation of devices, as will be hereinafter more fully set forth and claimed.

The objects of the invention, as above mentioned, are accomplished by the means illustrated in the accompanying drawings, in which similar letters indicate like parts.

In the said drawings, Figure 1 is a perspective view showing the machine in the field ready for use. Fig. 2 represents an elevation, partly in section, of the truck or carriage upon which the separator and its steam-motor are to be mounted; and Fig. 3 represents a detached plan view showing the carriers by which the grain is conveyed from the header to the separator.

The letter A indicates the carriage or truck of the separator, which consists of a strong iron and wood frame having its forward ends bent upward into a "goose-neck," as shown clearly in Figs. 1 and 2 of the drawings. The said forward ends are brought together as shown in Fig. 1, and are secured to the forward axle B by means of a king-bolt passing through said forward ends and the axle, as shown in Fig. 2 of the drawings. This construction, it will be seen, permits the forward wheels to be turned to the fullest extent, passing under the goose-neck in doing so, in order that sharp turns may be made, and the apparatus worked well up into close places and corners. The rear axle, C, is bent downward and passes under the frame A, to which it is securely bolted, and the frame is braced and strengthened by cross-ties D at suitable intervals. E indicates the wheels, which are fitted upon the axles in the usual manner.

The letter F indicates the thrashing and separating machine, which may be of any approved construction, and which is mounted upon the forward part of the frame A, just back of the goose-neck before mentioned.

To the rear of the frame is mounted the steam-motor G, consisting of a boiler and engine of the ordinary portable type, the fire-box of the boiler resting directly upon the frame, and the forward part upon a prop resting upon the rear cross-tie of the frame. This engine has no connection with the truck or carriage wheels, being intended only as a motor for the driving-gearing of the separator with which it is connected by the band or belt H, extending from the fly-wheel I, as fully shown in Fig. 1 of the drawings.

To one side of the separator, near the top, is secured a frame, K, by means of the beams or connections L.

The frame at each end has journaled between its sides the rollers M M', over which passes a traveling carrier or belt, N, having the usual transverse carrier-ribs P. The sides of the carrier-frame extend above the upper surface of the belt, to prevent the grain from falling off and wasting.

Across the front end of the frame K extends a similar shorter carrier-frame, R, which is provided with rollers S S' and a carrier-belt, T. The sides and one end of said frame are extended above the upper surface of the belt like the sides of the frame K for the same purpose. The frame R sets just below the frame K and just above the cylinder U of the separator, so as to convey the grain to said cylinder to be separated. The rollers M' and S' have their contiguous journals provided with intergearing beveled cog-wheels V, by means of which they are caused to travel together, the rollers receiving their motion through the medium of any convenient gearing receiving its motion from the running-gear of the separator, and which may be varied to suit the requirements of the case in the employment of different styles of separators without departing from the spirit of my invention.

The letter W in Fig. 3 shows the header-spout in the position it would assume in the act of delivering the grain to the belt or carrier K of the separator.

The invention resides in the arrangement of parts and in the adaptation of the carriers relatively to each other, all as hereinafter described and claimed.

The header is of that class which is advanced in front of the draft-animals, and is arranged to travel at one side of the separator-carriage, as shown in the drawings.

The carriage is drawn by draft-animals hitched in front, as shown.

The operation of my invention will be evident from the above description and accompanying drawings, the grain being cut by the header as it traverses the field, then delivered to the separator by means of the carriers, where it is separated as fast as delivered, as before stated.

Having thus fully described my invention, what I claim, and desire to secure by Letters Patent, is—

1. A traveling thrasher and separator adapted to operate in connection with a header, comprising the frame A, a portable engine mounted thereon, the thrasher arranged upon the said frame, the longitudinal endless carrier arranged upon the side of the thrasher, adapted to receive the grain from the header, and the transverse carrier adapted to carry the grain from the longitudinal carrier to the hopper of the thrasher, substantially as specified.

2. The machine described, comprising the truck or carriage A, adapted to be drawn by horse-power, the steam-engine, the thrasher arranged upon the frame A, to be drawn by horse-power, the longitudinal and transverse carriers, arranged as shown, and adapted to conduct the grain from the header-spout to the hopper of the thrasher, substantially as specified.

In testimony whereof I affix my signature in presence of two witnesses.

WINTHROP NORTON.

Witnesses:
N. M. FRAKES,
JACOB MARTIN.